United States Patent [19]

Mayfield

[11] Patent Number: 4,887,487
[45] Date of Patent: Dec. 19, 1989

[54] HYDRO-PLANETARY POWER DIVISION SYSTEM

[75] Inventor: Alfred B. Mayfield, Verdel, Nebr.

[73] Assignee: Charles D. Johnson, McPherson, Kans. ; a part interest

[21] Appl. No.: 190,349

[22] Filed: May 3, 1988

[51] Int. Cl.⁴ ............................................. F16H 47/04
[52] U.S. Cl. ..................................................... 74/687
[58] Field of Search .................................. 74/687, 720

[56] References Cited

U.S. PATENT DOCUMENTS

| | | | |
|---|---|---|---|
| 2,400,728 | 5/1946 | Akers | 74/687 X |
| 3,538,790 | 11/1970 | Polak | 74/687 X |
| 3,722,324 | 3/1973 | Cordner et al. | 74/687 |

FOREIGN PATENT DOCUMENTS

| | | | |
|---|---|---|---|
| 70206 | 3/1959 | France | 74/687 |
| 1207829 | 1/1986 | U.S.S.R. | 74/687 |

Primary Examiner—Dirk Wright
Attorney, Agent, or Firm—Hovey, Williams, Timmons & Collins

[57] ABSTRACT

A system for dividing rotary power to two or more output shafts includes planetary cluster cages that are associated with the output shafts and which are interconnected by a hydraulic circuit. In instances where the output shafts rotate at speeds different from one another, a portion of the power from the source is directed through the hydraulic circuit to cause rotation of spiders carrying planetary gears within the cluster cages coupling the output shafts to a primary driveshaft. The power division system is modular in nature in that the hydro-planetary cluster cages and associated drive axles can be easily added or deleted as desired.

14 Claims, 3 Drawing Sheets

Increased Pinion RPM     Decreased Pinion RPM

HYDRO-PLANETARY POWER DIVISION SYSTEM

BACKGROUND OF THE INVENTION

1. Field of the Invention

This invention relates to a power division system which includes hydraulically interconnected planetary gear assemblies for dividing and transferring rotational power to two or more output shafts rotatable at speeds differing from one another. The invention is particularly useful as a modular power distribution system for vehicles having multiple drive axles.

2. Description of the Prior Art

Tandem axle trucks and other vehicles having two drive axles are normally provided with either a bevel or planetary gear differential system for dividing and transferring rotational power from the engine to each of the drive axles. Systems of this type are known to function in a reasonably satisfactory manner for on the road and off the road vehicles.

It is possible to design a power division system using only gears to drive more than two drive axles in unison while applying equal torque to all axles. In practice, however, such systems are relatively complicated and bulky and are not practical for normal use.

Moreover, known power division systems consisting primarily of gears cannot be constructed to easily permit the addition or deletion of drive axles to an existing vehicle in a manner such that the system in use applies equal torque to all of the axles at all times even though the relative velocities of the axles may differ. Typically, the entire drive system must be redesigned from the front to the back if the operator wishes to add or remove a drive axle.

As can be appreciated from the foregoing, there is a need in the art for a versatile and efficient means of dividing rotational power from a power source between two or more separate work destinations or secondary driveshafts which may rotate at speeds slightly different from one another as may occur, for example, when tires of unequal diameter are mounted on the axles. Moreover, it would be desirable to provide a power division system that may be easily modified by increasing or decreasing the number of drive axles without undue labor or expense.

SUMMARY OF THE INVENTION

My present invention is directed toward a power division system especially useful for trucks and other vehicles having multiple drive axles. Each of the drive axles is provided with a planetary cluster cage hydraulically interconnected with each of the remaining cluster cages. In instances where the need arises for a power division or difference in rotational speed between the drive axles, a portion of the rotational power from the primary driveshaft is transferred through the hydraulic circuit so that rotational power is divided substantially equally between the driveshafts even the though latter are turning at unequal velocities.

In more detail, each of the planetary cluster cages of the invention has a drive ring gear fixed to the primary driveshaft, and a driven ring gear coupled to a pinion gear for rotation of the drive axles. Each cluster cage also has a pair of planetary gears that are mounted on a rotatable spider and transfer rotational movement from the drive gear to the driven gear.

In instances where the drive axles rotate at equal speeds as may occur when the vehicle is traveling over a smooth, level section of straight roadway, the spider supporting the planetary gears of each cluster cage remains generally stationary and the rotational velocity of the drive gear is equal to the rotational speed of the corresponding driven gear. However, in cases where the need arises for the rotational speed of one drive axle to vary somewhat from the rotational speed of the remaining axles, the spider supporting the planetary gears turns relative to the primary driveshaft and operates a hydraulic gear pump located within the planetary cluster cage. The gear pump is hydraulically interconnected with gear pumps associated with the remaining planetary cages, and the hydraulic pressure thus established by the gear pump rotates the remaining gear pumps to cause the spiders supporting the planetary gears of the other cages to also turn, consequently varying the speed of the associated driveshafts in proportional relationship.

Preferably, the gear teeth of the planetary cluster cage are constructed such that a relatively small difference in rotating speed between the spider supporting the planetary gears and the primary driveshaft results in a relatively high rotational velocity of the gear pumps. In this manner, torque loadings on the gear pumps and pressures within the hydraulic fluid lines are kept within acceptable limits.

In accordance with one preferred form of the invention, hydraulic fluid conduits interconnecting the gear pumps are routed through passages of the primary driveshaft and also through the center of universal joints coupling one primary driveshaft to another. The hydraulic lines are therefore substantially concealed and protected, and additional drive axles may be easily installed by adding another section of the primary driveshaft and coupling the appropriate hydraulic conduits together.

In one alternate embodiment of the invention, planetary cluster cages are connected to opposite ends of a crankshaft of an engine located between the drive axles. In this type of construction, the hydraulic conduits interconnecting the cluster cages are routed through the engine via passages located within the crankshaft.

DETAILED DESCRIPTION OF THE EMBODIMENT SHOWN IN FIGS. 1-9

Figure 1:
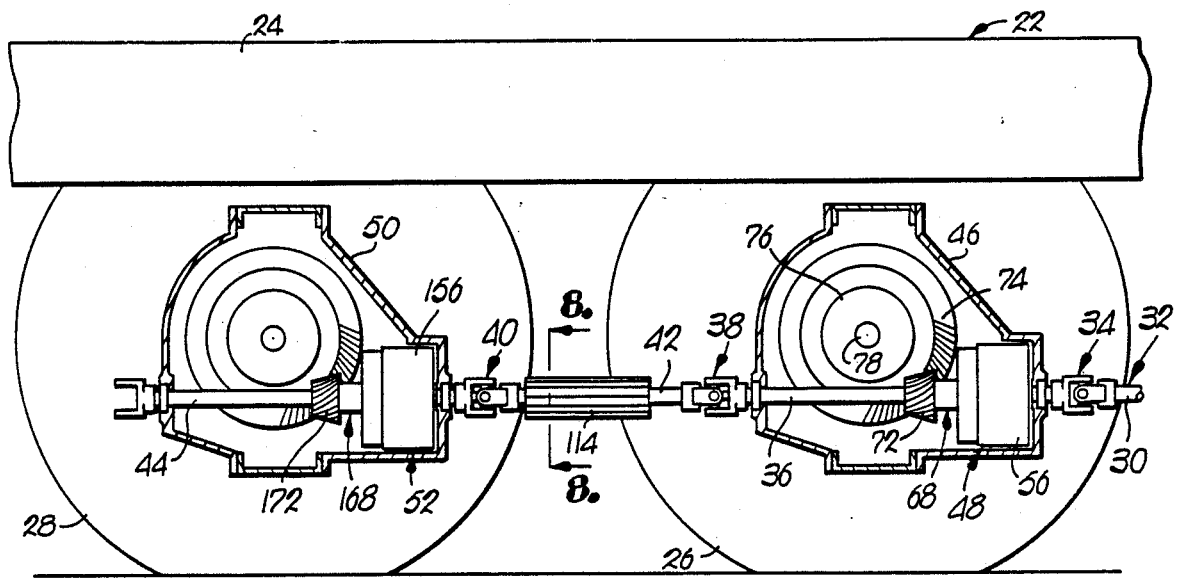
FIG. 1 is a fragmentary, side crosssectional view of a hydraulic power division system constructed in accordance with the invention wherein two hydro-planetary cluster cages are provided for dividing rotational power between two separate drive axles.

Referring initially to FIG. 1, a hydroplanetary division system 20 constructed in accordance with one embodiment of my present invention is illustrated for use with a dual drive axle truck 22 having a frame 24 and tires 26, 28 although, of course, other applications are also possible. Truck 22 is provided with an engine (not shown) representing a source of rotary power that is driving coupled to a first section 30 of a line shaft or primary driveshaft 32. The first section 30 is connected by a universal join 34 to a second section 36 of the primary driveshaft 32 which, in turn, is connected by respective universal joints 38, 40 to a third section 42 and a fourth section 44 of the primary driveshaft 32.

The second section 36 of the primary driveshaft 32 extends through a housing 46 which encloses a first hydro-planetary cluster cage 48. Similarly, the fourth section 44 of the primary driveshaft 32 extends through a housing 50 that envelopes a second hydro-planetary cluster cage 52. The cluster cage 48 is substantially identical to the cluster cage 52 and thus a detailed description will be presented only with reference to the former.

Figure 3:
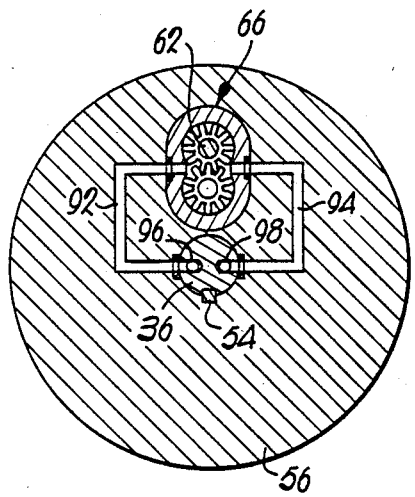
FIG. 3 is an enlarged, end cross-sectional view taken along line 3—3 of FIG. 2, depicting a gear pump of the cluster cage which is coupled by passages to hydraulic conduits extending through a primary driveshaft.
Figure 2:
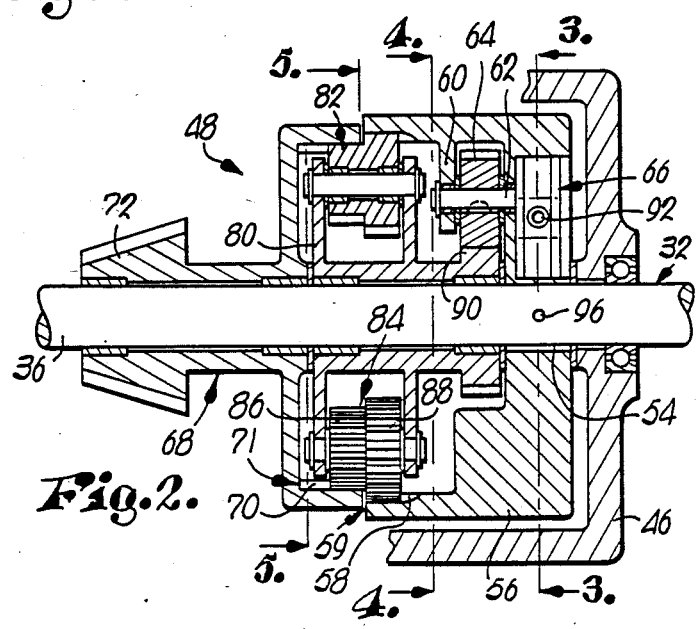
FIG. 2 is a fragmentary, enlarged side cross-sectional view of one of the hydro-planetary cluster cages illustrated in FIG. 1.
Figure 4:
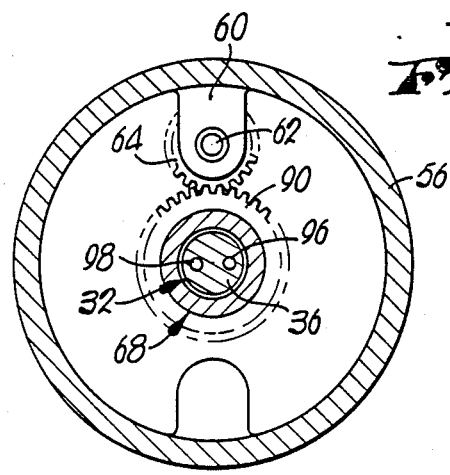
FIG. 4 is an enlarged, end elevational view taken along line 4—4 of FIG. 2 to illustrate a drive gear of the hydraulic gear pump which is in meshed engagement with a gear of a secondary driveshaft.
Figure 5:
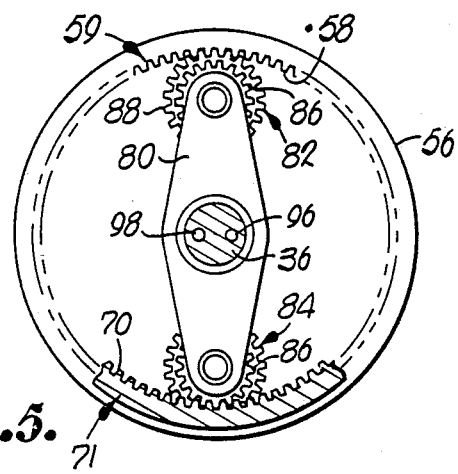
FIG. 5 is an enlarged, end cross-sectional view taken along line 5—5 of FIG. 2, showing planetary gears and a spider supporting the same.

Referring now to FIGS. 2 and 3, the second driveshaft section 36 is fixedly coupled by means of a key 54 to a casing 56 that is provided with a set of internal teeth 58 presenting an internal ring gear or drive gear 59 as can also be appreciated by reference to FIG. 5. As shown in FIG. 4, the casing 56 includes a lug 60 which supports a shaft 62 fixedly coupled to a gear 64 which is also shown in FIG. 2. The shaft 62 is also an input/output shaft for a gear pump 66 shown in FIGS. 2 and 3.

An output shaft or secondary driveshaft 68 surrounds the second driveshaft section 36 and is rotatable relative to the latter. The secondary driveshaft 68 is integrally formed with a set of teeth 70 (FIGS. 2 and 5) presenting an internal ring gear or driven gear 71 somewhat similar to the drive gear 59 presented by teeth 58, although the driven gear 71 is somewhat smaller in internal effective diameter than the drive gear 59. The secondary driveshaft 68 is also formed on one end with a pinion gear portion 72 which meshingly engages a hypoid ring gear 74 that is illustrated in FIG. 1.

The tire 26 is securely coupled to a drive axle (not shown) fixedly connected to the hypoid ring gear 74. The aforementioned drive axle is also coupled to a gear cluster mechanism 76 that, in turn, drives a drive axle 78 for rotation of a tire (not shown) positioned opposite tire 26 in directions transverse to the normal path of travel of truck 22.

Referring to FIGS. 2 and 5, a spider 80 carries on opposite sides two freely rotatable planetary gears 82, 84 which are essentially identical. Each of the planetary gears 82, 84 has a reduced diameter portion with teeth 86 in meshing engagement with teeth 70 of the secondary driveshaft 68. Additionally, each of the planetary gears 82, 84 has a larger diameter portion with teeth 88 in meshing contact with teeth 58 of the casing 56.

The spider 80 is also integrally formed with a gear 90 (FIGS. 2 and 4) having teeth which mesh with the gear 64 carried by the casing 56. Consequently, rotational movement of the spider 80 carrying the planetary gears 82, 84 effects rotation of gear 64 and gear pump 66 and vice-versa.

As illustrated in FIG. 3, a pair of fluid passages 92, 94 interconnect the gear pump 66 and fluid conduits 96, 98 formed in the primary driveshaft section 36. As shown in FIGS. 2 and 3, the fluid conduits 96, 98 include a small portion extending transversely of the driveshaft section 36 for connection with passages 92, 94, but the majority of the length of conduits 96, 98 is parallel to the longitudinal axis of the driveshaft section 36 as can be appreciated by reference to FIGS. 4 and 5.

Figure 6:
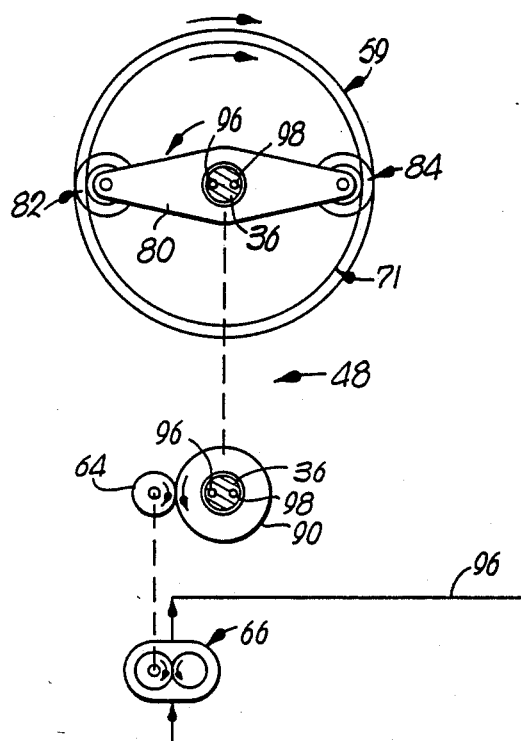
FIG. 6 is an essentially schematic representation of the hydraulic circuit for the power division system shown in FIG. 1, depicting for exemplary purposes operation of the gear pumps and rotation of spiders supporting the planetary gears in an instance where the need for a power division has arisen.
Figure 6:
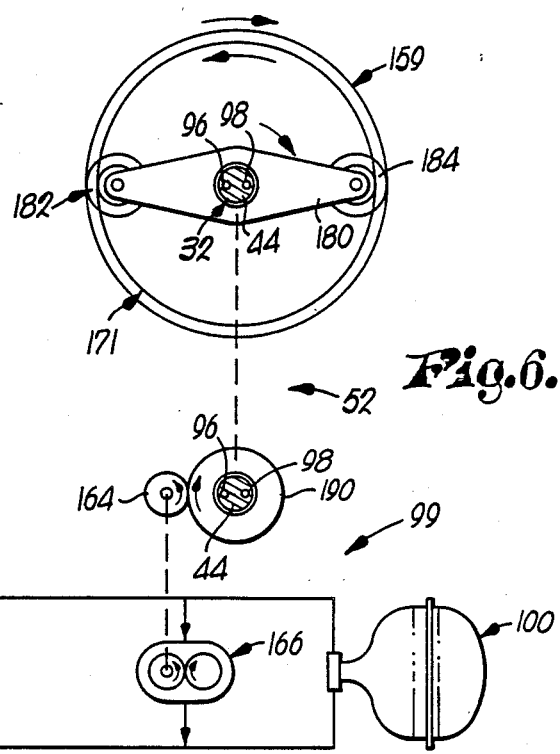

FIG. 6 represents a essentially schematic representation of a hydraulic circuit 99 that interconnects gear pump 66 of the first hydro-planetary cluster cage 48 and a similar gear pump 166 of the second hydro-planetary cluster cage 52. As shown, the gear pumps 66, 166 are arranged in a parallel circuit relationship, and are also connected in parallel manner to a hydraulic fluid accumulator 100 described in more detail hereinbelow.

The hydro-planetary cluster cage 52 as shown in FIG. 1 is, as mentioned above, similar for essential purposes with the components of the hydroplanetary cluster cage 48. As shown in FIG. 6, the cluster cage 52 includes a gear 164 connected by a shaft to gear pump 166, and the gear 164 is in meshing contact with a gear 190 that comprises an integral portion of a rotatable spider 180 similar to spider 80. The spider 180 carries planetary gear 182, 184 which mesh with drive gear 159 and driven gear 171 that correspond in nature to gears 59, 71 respectively of the first cluster cage 48.

Figure 7:
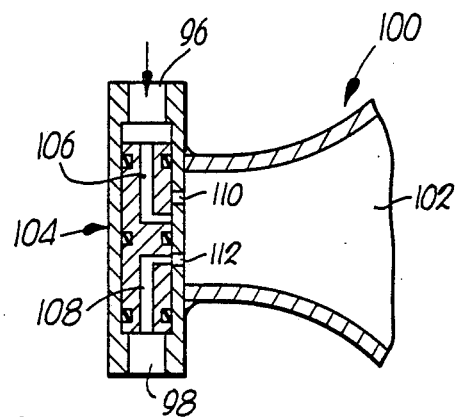
FIG. 7 is an enlarged, fragmentary, side cross-sectional view of a hydraulic fluid accumulator and shunt valve which are also shown in FIG. 6.

Referring now to FIG. 7, the accumulator 100 has walls defining an internal chamber 102 for storage of a quantity of reserve operating hydraulic fluid. The accumulator 100 is also provided with a sliding shunt valve 104 having passages 106, 108 in communicating with fluid conduits 96, 98 respectively. The chamber 102 has two orifices 110, 112 which are placed in either communicative or non-communicative relationship to the passages 106, 108 in accordance with the position of shunt valve 104.

In particular, when pressure in the fluid conduit 96 exceeds pressure in the fluid conduit 98, the shunt valve 104 shifts to the position shown in FIG. 7 such that passageway 108 communicates, via orifice 112, the chamber 102 with the conduit 98. In this manner, a reserve quantity of hydraulic fluid is presented to the low pressure side of the hydraulic circuit 99. In instances where the pressure in conduit 98 exceeds the fluid pressure in conduit 96, however, the shunt valve 104 shifts upwardly (viewing FIG. 7) such that passage 106 communicates conduit 96 with chamber 102 through orifice 110, and passage 108 is substantially closed by the flat, smooth wall between orifices 110, 112.

Figure 8:
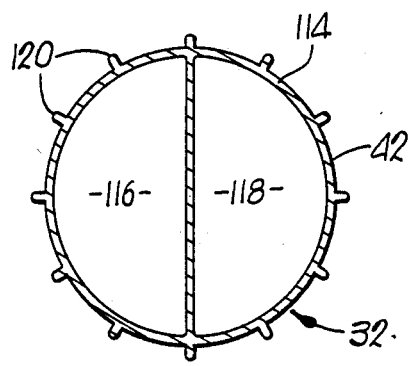
FIG. 8 is an enlarged, end cross-sectional view taken line 8—8 of FIG. 1 to illustrate the interior configuration of a drive tube for hydraulic fluid storage and cooling.

As illustrated in FIG. 1, the third section 42 of the primary driveshaft 32 includes a drive tube 114 in the shape of a hollow cylinder. The drive tube 114, as shown in more detail in Fig. 8, is partitioned to present side-by-side chambers 116, 118 in communication with the fluid conduits 96, 98 respectively. The enlarged chambers 116, 118 contain additional or reserve quantities of hydraulic oil, and a plurality of radially extending cooling fins 120 spaced around the periphery of the drive tube 114 facilitate cooling of the fluid within chambers 116, 118.

Figure 9:
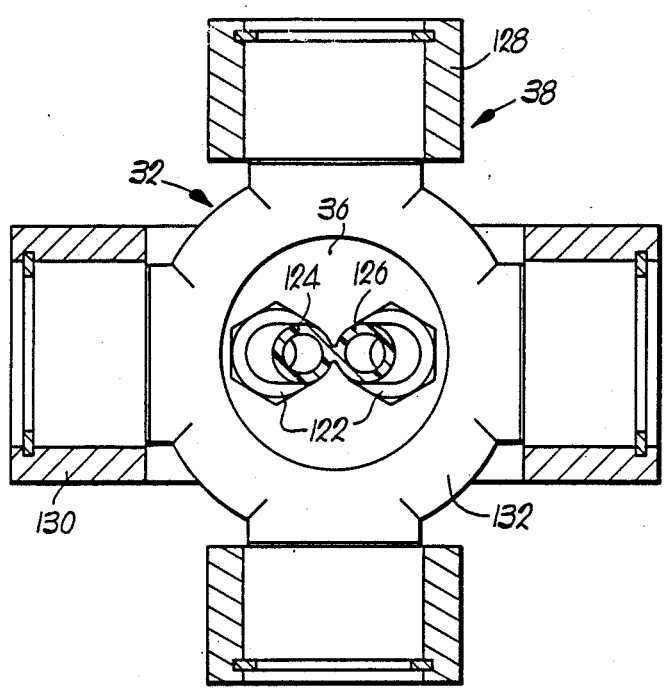
FIG. 9 is an enlarged, end cross-sectional view of one of the universal joints illustrated in FIG. 1, showing the routing of hydraulic fluid tubing through the center of the universal joint.

FIG. 9 depicts for illustrative purposes the routing of the fluid conduits 96, 98 through the universal joint 38, although of course similar routing of the conduits 96, 98 may be provided for other universal joints of the system 20. As illustrated, fittings 122 coupled to the end of the second primary driveshaft section 36 are connected with sections of tubing 124, 126 representing a part of the conduits 96, 98. The tubing sections 124, 126 are interconnected by fittings similar to fittings 122 to the proximal end of the third driveshaft section 42. A yoke 128 secured to the end of second driveshaft section 36, a yoke 130 connected to the adjacent end of the third driveshaft section 42 and a center spider 132 all have central passages surrounding the tubing sections 124, 126, the latter of which are somewhat flexible to accommodate pivotal movement of the yoke 128 relative to the yoke 130.

OPERATION OF THE EMBODIMENT SHOWN IN FIGS. 1-9

When the truck 22 travels on a smooth, level road and all of the tires, including tires 26, 28 associated with the secondary driveshafts 68, 168 are of equal diameter, driveshafts 68, 168 turn at substantially identical velocities and spiders 80, 180 remain substantially stationary relative to casing 56 and secondary driveshaft 68, and casing 156 and secondary driveshaft 168 respectively. That is, gear pumps 66, 166 do not operate to pump fluids and the primary driveshaft 32 turns with a rotational velocity substantially equal to the rotational velocity of secondary driveshafts 68, 168.

However, should a difference in rotational speed of the driveshafts 68, 168 arise, as for example in instances where the tires are of unequal diameters, spider 80 begins to rotate and consequently the rotational speed of secondary driveshaft 68 is different from the rotational velocity of primary driveshaft 32. At the same time, the spider 80 and associated gears 90, 64 initiate operation of the gear pump 66 to thereby pressurize hydraulic fluid within one of the conduits 96, 98, which pressure is then transmitted to the other gear pumps such as gear pump 166 of system 20.

Consequently, gear pump 166 operates to rotate the spider 180 in a direction opposite to the direction of rotation of spider 80, and thus turn gear 190 and the spider 180 associated therewith. As the planetary gears 182, 184 move with the spider 180, the rotational speed of the secondary driveshaft 166 is thereby varied in inverse proportional relationship to the difference in speed between the secondary driveshaft 68 and primary driveshaft 32.

For example, if tire 26 is of slightly smaller diameter than the tire 28, tire 26 and the associated secondary driveshaft 68 rotate at a slightly greater speed than tire 28 and secondary driveshaft 168, and thus secondary driveshaft 68 rotates slightly faster than the rotational speed of the primary driveshaft 32 while secondary driveshaft 168 rotates slightly slower than the rotational speed of primary driveshaft 32. This particular example is illustrated schematically in FIG. 6, wherein the increased velocity of pinion gear 74 causes counter-clockwise rotation of spider 80 (relative to the primary driveshaft 32) as shown in the drawings to rotate gears 90, 64 and thereby turn gear pump 66. Pressure in the fluid conduit 96 established by gear pump 66 in transferred to gear pump 166 for movement of the latter, (relative to primary driveshaft 32) as well as gears 164, 190 in generally opposite direction to the direction of rotation of the correspondingly numbered components of the first cluster cage 48. As a result, the spider 180 turns in a clockwise direction (viewing FIG. 6) such that the rotational speed of the drive gear 159 of casing 156 (FIG. 1) is somewhat slower than the rotational velocity of the driven gear 171 of secondary driveshaft 168, including pinion gear 174. Tire 28 thus turns at a correspondingly slower speed than the rotation of tire 26 even though the rotation velocity of the primary driveshaft 32 remains unaffected. (In this regard, it should be noted that the arrows in FIG. 6 indicating the direction of movement of gears 59, 71, 159, 171 are intended to illustrate rotational movement relative to rotation of primary driveshaft 32.)

As a consequence, power from the primary driveshaft 32 is applied in substantially equal amounts to both of the tires 26, 28 even though the latter turn at velocities somewhat different from one another. The torque of the primary driveshaft 32 is primarily transferred from the casing 56 directly to secondary driveshaft 68 and from the casing 156 directly to the secondary driveshaft 168 through gears 59, 71, 159, 171 and their associated planetary gears, but a portion of the power is transferred by means of the hydraulic circuit 99 due to the influence of gear pumps 66, 166. The hydraulic circuit 99 in use operates automatically to self-balance the velocity of the spiders 80, 180 in accordance with the rotational demand of the secondary driveshafts 68, 168 without the need for operator attention such that during turns, off-road use or over uneven surfaces, smooth compensation is instantly effected for variations in rotational speeds between the tires 26, 28.

As can now be appreciated by those skilled in the art, the system 20 is modular in nature in that additional hydro-planetary cluster cages and associated drive axles can be added or deleted as necessary. As an example, an additional section of primary driveshaft may be coupled to the trailing end of the fourth primary driveshaft section 44, and tubing similar to tubing 124, 126 readily coupled to the fluid conduits 96, 98 formed in the fourth primary driveshaft section 44. Once a sufficient quantity of fluid is added to the circuit 99, all of the gear pumps of the various cluster cages automatically function to divide rotational power from the primary driveshaft 32 to each of the secondary driveshafts as may be necessary in accordance with the demands of the drive axles and in a manner such that substantially equal power is applied to each of the secondary driveshafts even though the latter may turn at speeds differing from one another.

Preferably, components of the cluster cages 48, 52 are constructed so that a relatively small rotational velocity of spiders 80, 180 results in a relatively high rotational speed of the hydraulic gear pumps 66, 166. As a consequence, torque loadings on the gear pumps 66, 166 and hydraulic fluid pressures within the circuit 99 are maintained within reasonable working limits.

EMBODIMENTS OF FIGS. 10 AND 11

Figure 10:
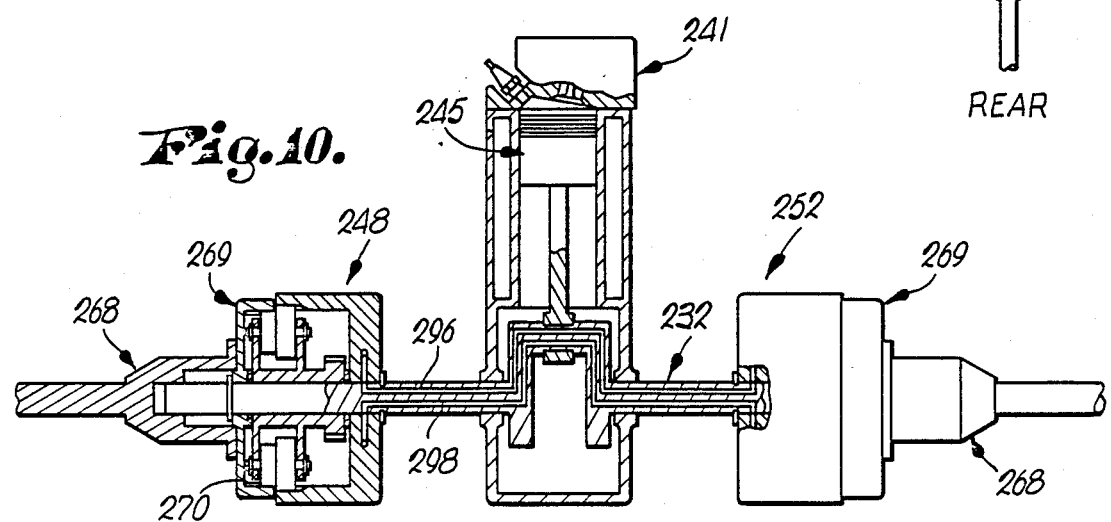
FIG. 10 is a fragmentary, side elevational view with parts broken away in section of another embodiment of the invention.

In FIG. 10, a variation of the present invention is illustrated wherein an engine 241 is disposed between two hydro-planetary cluster cage 248, 252 which are somewhat similar in construction and operation to the hydro-planetary cluster cages 48, 52. In the embodiment shown in FIG. 10, however, fluid conduits 296, 298 interconnecting the cluster cages 248, 252 extend through passages of a primary driveshaft 232 which in this instance also represents a crankshaft directly, pivotally coupled to a piston assembly 245 of engine 241. Routing of the fluid conduits 296, 298 in this manner eliminates the need for more complicated fluid pathways externally of engine 241. In this embodiment, it is also to be noted that secondary driveshafts 268 of the cluster cages 248, 252 surround an end portion of the primary driveshaft 232 and are connected to an internal ring gear member 269 presenting teeth 270.

Figure 11:
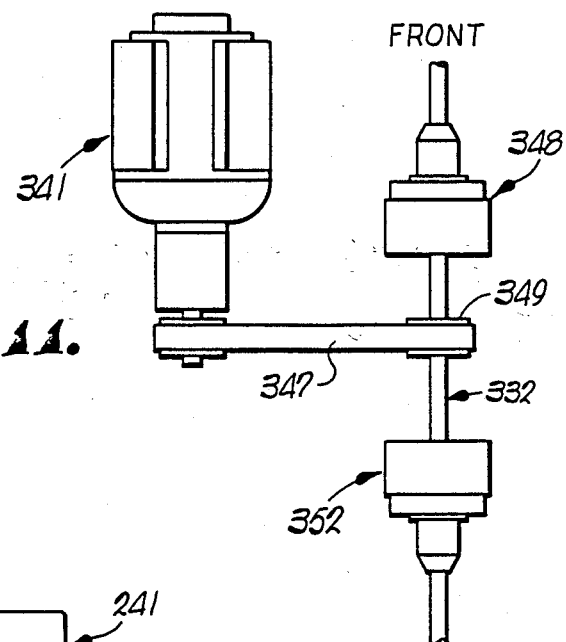
FIG. 11 is a fragmentary plan view of yet another embodiment of the invention.

Another embodiment of my invention is shown in FIG. 11, wherein an engine 341 is connected by a drive belt 347 to a complementally-configured pulley 349 fixed to a mid portion of a primary driveshaft 332. In turn, two hydro-planetary cluster cages 348, 352 are located adjacent the front and rear of a vehicle (not shown), and the cluster cages 348, 352 are constructed and operate substantially in identical fashion to the cluster cages 48, 52 of the embodiment shown in FIGS. 1-9. In the embodiment shown in FIG. 11, hydraulic fluid conduits (not shown) can thus be routed directly along the straight, primary driveshaft 332 to both of the cluster cages 348, 352 in relatively simple fashion.

It is to be understood that, in all of the embodiments described hereinabove, features normally associated with construction of the vehicle and essential for its operation would normally be added to the components shown in the drawing as necessary or desired. For example, the third primary driveshaft section 42 shown in FIG. 1 may be provided with a telescopic, extensible joint to accommodate vertical shifting of one of the tires 26, 28 relative to the other.

From the foregoing, it should now be realized that my invention represents an especially effective means for dividing rotational power between two separate work destinations. Although the embodiments described in detail refer to utilization of the invention in combination with a motorized vehicle, it is understood of course that the invention is useful in other applications wherever a division of rotary power is desired. Accordingly, the invention should be deemed limited only by a fair scope of the claims which follows.

I claim:

1. A hydraulic power division system for transferring rotational movement from a source of rotary power to at least two secondary driveshafts comprising:

a primary driveshaft adapted for connection with a source of rotary power;

first and second drive gears connected to said primary driveshaft at spaced apart locations along the latter;

first and second driven gears associated with said first and second drive gears respectively;

first and second secondary driveshafts connected to said first and second driven gears respectively;

first means interconnecting said first drive gear and said first driven gear for rotation of said first driven gear at any one of a number of velocities relative to the rotational velocity of said first drive gear and thereby of said primary driveshaft, said first means including planetary gears, and a spider carrying said planetary gears and supported for rotation around said primary driveshaft;

second means interconnecting said second drive gear and said second driven gear for rotation of said second driven gear at any one of a number of velocities relative to the rotational velocity of said second drive gear and thereby of said primary driveshaft; and hydraulic means coupling said first means to said second means for varying the rotational velocity of said first driven gear relative to said primary driveshaft in generally proportional relationship to the variance in rotational speed of said second driven gear relative to said primary driveshaft in order to permit a corresponding variation in rotational velocity of said first secondary driveshaft relative to the rotational velocity of said second secondary driveshaft.

2. The invention as set forth in claim 1, wherein said hydraulic means includes a gear pump coupled to said first means.

3. The invention as set forth in claim 1, wherein said hydraulic means includes first and second gear pumps coupled to said first means and said second means respectively.

4. The invention as set forth in claim 3, wherein said hydraulic means further includes an accumulator for storing a quantity of reserve hydraulic fluid.

5. The invention as set forth in claim 4, wherein said accumulator includes structure defining a shiftable shunt valve.

6. The invention as set forth in claim 5, wherein said hydraulic means includes two hydraulic fluid conduits, and said shunt valve shifts in accordance with the pressures in either of said conduits to bring reserve oil stored in said accumulator in communication with the fluid conduit having the lower fluid pressure.

7. The invention as set forth in claim 1, wherein said primary driveshaft extends through said first secondary driveshaft and said second secondary driveshaft for rotation relative thereto.

8. The invention as set forth in claim 1, wherein said source of rotary power comprises an internal combustion engine having at least one piston, and wherein said primary driveshaft is in the nature of a crankshaft extending through said engine and connected to said at least one piston.

9. The invention as set forth in claim 1, wherein said primary driveshaft has a central portion adapted for connection with said source of rotary power, and wherein said primary driveshaft presents opposite end portions connected to said first and said second drive gears respectively.

10. The invention as set forth in claim 1, wherein said hydraulic means includes structure forming hydraulic fluid conduits within said primary driveshaft.

11. The invention as set forth in claim 1, wherein said primary driveshaft includes selectively connectable sections having structure adapted for connecting additional sections to or deleting already connected sections from said primary driveshaft.

12. A hydraulic power division system for transferring rotational movement from a source of rotary power to at least two secondary driveshafts comprising:

a primary driveshaft adapted for connection with a source of rotary power;

first and second drive gears connected to said primary driveshaft at spaced apart locations along the latter;

first and second driven gears associated with said first and second drive gears respectively;

first and second secondary driveshafts connected to said first and second driven gears respectively;

first means interconnecting said first drive gear and said first driven gear for rotation of said first driven gear at any one of a number of velocities relative to the rotational velocity of said first drive gear and thereby of said primary driveshaft;

second means interconnecting said second drive gears and said second driven gear for rotation of said second driven gear at any one of a number of velocities relative to the rotational velocity of said second drive gear and thereby of said primary driveshaft; and hydraulic means coupling said first means to said second means for varying the rotational velocity of said first driven gear relative to said primary driveshaft in generally proportional relationship to the variance in rotational speed of said second driven gear relative to said primary driveshaft, said hydraulic means including first and second gear pumps coupled to said first means and said second means respectively and an accumulator for storing a quantity of reserve hydraulic fluid, in order to permit a corresponding variation in rotational velocity of said first secondary driveshaft relative to the rotational velocity of said second secondary driveshaft.

13. A hydraulic power division system for transferring rotational movement from a source of rotary power to at least two secondary driveshafts comprising:

a primary driveshaft adapted for connection with a source of rotary power; first and second drive gears connected to said primary driveshaft at spaced apart locations along the latter;

first and second driven gears associated with said first and second drive gears respectively;

first and second secondary driveshafts connected to said first and second driven gears respectively, said primary driveshaft extending through said first secondary driveshaft and said second secondary driveshaft for rotation relative thereto;

first means interconnecting said first drive gear and said first driven gear for rotation of said first driven gear at any one of a number of velocities relative to the rotational velocity of said first drive gear and thereby of said primary driveshaft;

second means interconnecting said second drive gear and said second driven gear for rotation of said second driven gear at any one of a number of velocities relative to the rotational velocity of said second drive gear and thereby of said primary driveshaft; and hydraulic means coupling said first means to said second means for varying the rotational velocity of said first driven gear relative to said primary driveshaft in generally proportional relationship to the variance in rotational speed of said second driven gear relative to said primary driveshaft in order to permit a corresponding variation in rotational velocity of said first secondary driveshaft relative to the rotational velocity of said second secondary driveshaft.

14. The invention as set forth in claim 13, wherein said source of rotary power, said primary driveshaft and said secondary driveshafts are coaxial.

* * * * *